United States Patent [19]

Kennedy et al.

[11] Patent Number: 5,736,956
[45] Date of Patent: Apr. 7, 1998

[54] UNLOCKED W-BAND RECEIVER WITH COHERENT FEATURES

[75] Inventors: Thomas A. Kennedy, Manhattan Beach; Kapriel V. Kirkorian, Agoura; Robert A. Rosen, Agoura Hills, all of Calif.

[73] Assignee: Hughes Electronics, Los Angeles, Calif.

[21] Appl. No.: 660,654

[22] Filed: Jun. 4, 1996

[51] Int. Cl.$^6$ .................................................. G01S 13/00
[52] U.S. Cl. .................. 342/90; 342/62; 342/97; 342/196; 342/89
[58] Field of Search .................... 342/62, 90, 97, 342/196, 202, 89

[56] References Cited

U.S. PATENT DOCUMENTS

| | | | |
|---|---|---|---|
| 4,088,997 | 5/1978 | Winderman | 342/90 |
| 4,334,224 | 6/1982 | Gordon | 342/196 |
| 4,679,207 | 7/1987 | Tsuda | 342/149 |
| 5,339,084 | 8/1994 | Watanabe et al. | 342/160 |
| 5,473,331 | 12/1995 | Kennedy et al. | 342/62 |
| 5,594,450 | 1/1997 | Schober | 342/159 |

*Primary Examiner*—J. Woodrow Eldred
*Attorney, Agent, or Firm*—Leonard A. Alkov; Wanda K. Denson-Low

[57] ABSTRACT

A coherent radar receiver that has pulse-to-pulse coherence using an unlocked voltage controlled oscillator, such as a Gunn voltage controlled oscillator. The present invention is a W-band, for example, bistatic receiver that uses a scanning sum channel antenna to scan the target, a downconverter for downconverting received alternating sum and difference pulse echoes from the bistatic illuminator to provide video signals, and processing circuits for processing the downconverted the video signals to precisely locate the null position on the target. A Fourier transform circuit, magnitude detector and a peak detection and centroid circuit are used to generate a voltage frequency control output signal that is applied to the voltage controlled oscillator or local oscillator that controls its frequency. An angle estimation algorithm is used that processes the video signals to locate the null offset from the center of a scan pattern generated by the antenna. The present invention thus provides for an inexpensive weapon receiver at W-band, for example, using an inexpensive unlocked voltage controlled oscillator. The pulse-to-pulse coherence achieved by the receiver permits precise location of a target of interest from bistatic radar returns.

6 Claims, 1 Drawing Sheet

FIG. 1
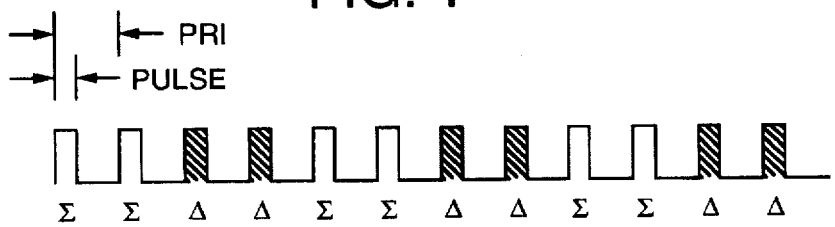
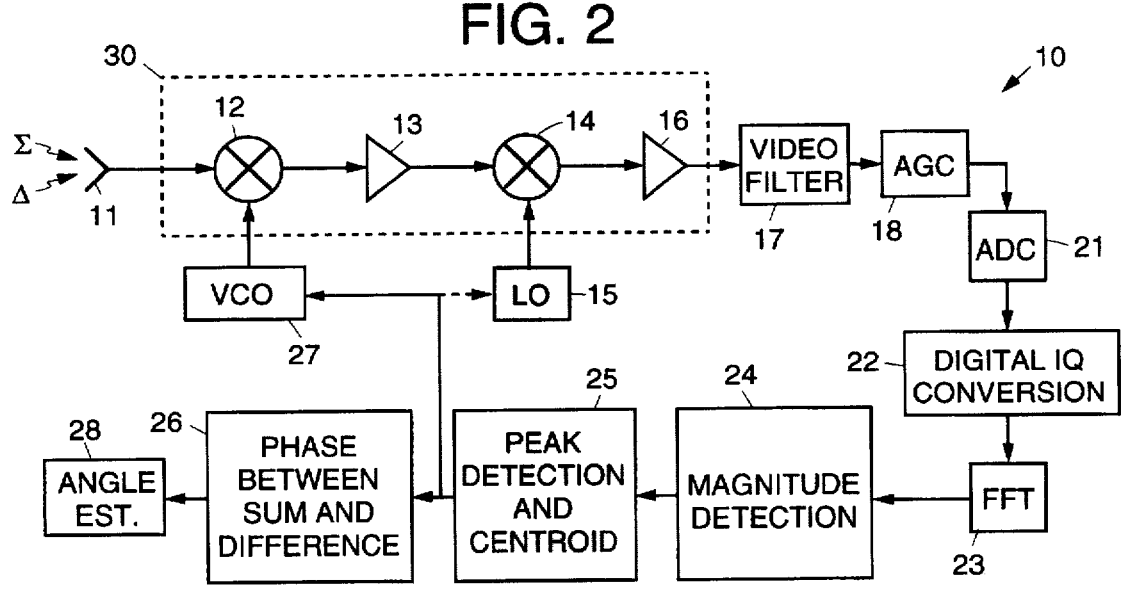
FIG. 2
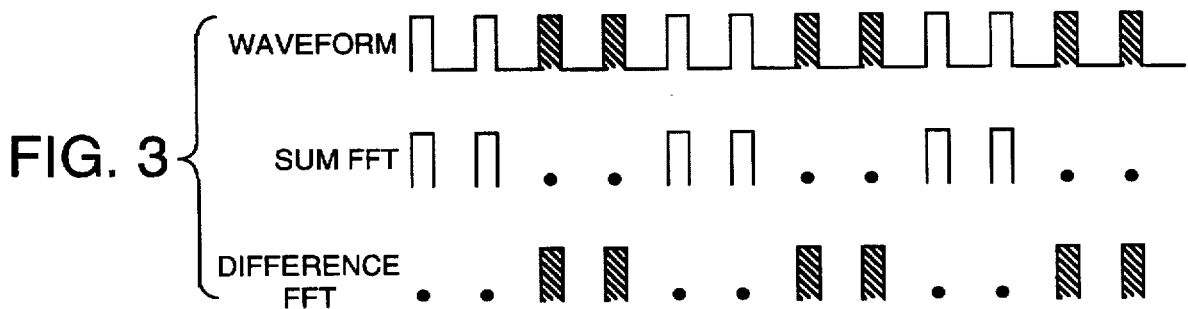
FIG. 3

UNLOCKED W-BAND RECEIVER WITH COHERENT FEATURES

BACKGROUND

The present invention generally relates to W-band radar receivers, and more particularly, to a coherent W-band radar receiver that provides pulse-to-pulse coherence using an unlocked voltage controlled oscillator.

Conventional W-band radar receivers employing unlocked voltage controlled oscillators are noncoherent and cannot be effectively employed for precise targeting.

Therefore, it is an objective of the present invention to provide for a coherent W-band radar receiver that provides pulse-to-pulse coherence using an unlocked voltage controlled oscillator.

SUMMARY OF THE INVENTION

To meet the above and other objectives, the present invention provides for a coherent radar receiver that has pulse-to-pulse coherence using an unlocked voltage controlled oscillator, such as a Gunn voltage controlled oscillator. The present invention provides for an inexpensive weapon receiver at W-band, for example, using the unlocked voltage controlled oscillator. The pulse-to-pulse coherence achieved by the radar receiver permits precise location of a target of interest from bistatic radar returns. The present invention enhances the performance of similar noncoherent receivers with unlocked voltage controlled oscillators but that cannot be effectively employed for precise targeting.

More specifically, the present invention is a W-band bistatic receiver that comprises a scanning sum-channel, a bistatic illuminator antenna that scans a target, a downconverter for downconverting received alternating sum and difference pulse echoes to provide video signals, and processing circuits for processing downconverted video signals to precisely locate the null position on the target. A Fourier transform circuit, magnitude detector and a peak detection and centroid circuit are used to generate a voltage frequency control output signal to an inexpensive voltage controlled oscillator (or local oscillator) that controls its frequency. An angle estimation algorithm is used that processes the video signals to locate the null offset from the center of a scan pattern generated by the antenna.

The present invention significantly improves the target location accuracy of bistatic weapon receivers with unlocked voltage controlled oscillators. Specifically, the present invention may be employed in a low cost and compact receiver for an inverse monopulse guidance system such as is described in U.S. Pat. No. 5,473,331, entitled "Combined SAR Monopulse and Inverse Monopulse Weapon Guidance", that is assigned to the assignee of the present invention. The present invention also may be advantageously employed in a precision adverse weather weapon system developed by the assignee of the present invention.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates a typical illuminator waveform employed in the present invention;

FIG. 2 illustrates a block diagram of a receiver in accordance with the principles of the present invention; and FIG. 3 shows insertion of sum and difference pulses into respective fast Fourier transforms used in the receiver of FIG. 2, and wherein dots indicate insertion of zeros.

DETAILED DESCRIPTION

For the purposes of example, in a precision adverse weather weapon system known as the PAWWS weapon system developed by the assignee of the present invention, an illuminator, or radar transmitter, (not shown) places a transmit difference channel null on a target of interest. The illuminator alternates between sum and difference channel transmit pulses. A W-band bistatic receiver on the weapon uses a scanning antenna that scans the target area using a sum channel only and precisely locates the null position. Tradeoff studies that have been conducted show that the null position can be very precisely located by the weapon if both the magnitude and relative phase of transmitted sum and difference channel pulses are measured. In accordance with one aspect of the present invention, a novel algorithm has been developed that is implemented in the present receiver that uses both amplitude and phase of these measurements to precisely locate a null offset from the center of a scan pattern generated by the scanning antenna.

In this algorithm, assuming a funnel null transmit pattern and a conical scan pattern by the scanning antenna on the weapon, azimuth and elevation offsets of the null from the center of the scan pattern are estimated by:

$$\hat{x} = \frac{k\Sigma|s|^2 x - \frac{1}{sx} Re\Sigma s^* d}{\Sigma|s|^2} \text{ and}$$

$$\hat{y} = \frac{k\Sigma|s|^2 y - \frac{1}{sy} Im\Sigma s^* d}{\Sigma|s|^2}$$

where $\Sigma$ denotes a sum over seeker beam positions, s is the sum voltage, d is the difference voltage, x and y are azimuth and elevation locations of the beam center, $k=1.2*$(seeker beamwidth/seeker scan diameter)$^2$, and sx and sy are azimuth and elevation difference channel slopes as seen by the seeker.

The first term in the numerator of the above equation determines the vector distance of the receiver scan center from the scatterer. The second term in the numerator of the above equation determines the vector displacement of the null from the scatterer. The difference of these terms yields the vector displacement of the receiver scan center from the null. Simulation results show that this algorithm provides highly accurate results in determining the location of the null and is robust against various clutter backgrounds, clutter discretes, and targets.

The transmit sum and difference channel pulses are tightly interleaved to allow accurate estimation of the relative difference to sum phase despite frequency variation and uncertainty of a voltage controlled oscillator in the receiver. This illumination waveform typically includes bursts of interleaved sum and difference channel pulses, having a duration of about 0.5 μsec each, at a pulse repetition frequency of about 75 kHz. The bursts are repeated every 0.5 msec for about 10 sec before weapon impact. The received sum channel pulses are generally much stronger than the difference channel pulses.

Thus, the sum channel pulses are used to derive the frequency of the voltage controlled oscillator relative to the received waveform. This frequency estimate is generally ambiguous with respect to the pulse repetition frequency (PRF). This does not affect the estimate of the relative phase between the sum and difference channels, because it corresponds to a phase ambiguity of exactly 360°.

If the waveform was a simple alternating sequence between sum and difference pulses, the frequency estimate would be ambiguous with respect to one-half the PRF, resulting in a relative phase ambiguity of 180°, which would make the phase information useless. The waveform of alternating pulse pairs shown in FIG. 1 and used in the present invention removes this 180° phase ambiguity. In FIG. 1, the Σ denotes a sum channel pulse and the Δ denotes a difference channel pulse.

With the above in mind, a block diagram of a reduced-to-practice embodiment of a receiver 10 in accordance with the principles of the present invention is depicted in FIG. 2. The receiver 10 comprises a scanning antenna 11 (such as generates a conical scan pattern, for example) that receives radar returns (sum and difference pulses as shown in FIG. 1) reflected from a target. A two-stage downconverter 30 is coupled to the antenna 11 that includes first and second sequentially-coupled mixers 12, 14, whose respective outputs are coupled through respective first and second amplifiers 13, 15. The first mixer 12 is coupled to an unlocked voltage controlled oscillator 27, such as an inexpensive unlocked Gunn oscillator 27. The second mixer 14 is coupled to a local oscillator 15.

The downconverter 30 downconverts the received radar returns to provide video signals corresponding thereto. An optional video filter 17 is coupled to the downconverter 30 and is used to filter the video signals. An optional automatic gain circuit 18 (AGC) is coupled to the video filter 17 which is followed by an analog-to-digital converter (ADC) 21 for digitizing the video signals, a digital IQ conversion circuit 22 for generating complex sum channel and difference channel samples, and sum and difference fast Fourier transforms (FFT) 23, for respectively generating sum and difference output signals. Sum and difference outputs generated by the fast Fourier transforms 23 and are coupled through a magnitude detector 24, a peak detection and centroid circuit 25 and a phase determination circuit 26 and applied to an angle estimation circuit 28.

The magnitude detector 24 detects the signal frequency using the output of the sum fast Fourier transform 23. The peak detection and centroid circuit 25 determines the offset of the center frequency of the unlocked voltage controlled oscillator at the center of the beam from the transmit frequency, and also provides a voltage frequency control output signal to the voltage controlled oscillator 27 that is used to control its frequency. The phase determination circuit 26 determines the phase between the sum and difference signals. The angle estimation circuit 28 is coupled to the phase determination circuit 26 and estimates the offset of the null from the center of the scan pattern using the magnitude and phase of the processed sum and difference return pulses and the null location algorithm described above.

In operation, the two-stage downconverter 30 performs downconversion to video before sampling (at 5 MHz for example) in the analog-to-digital converter 21. For a transmit burst of 0.2 msec duration, separate 16 point fast Fourier transforms 23, for example, are taken over the sum and difference channel returns. Insertion of the sum and difference channel pulses and zeros into respective sum and difference fast Fourier transforms 23 is illustrated in FIG. 3, wherein dots indicate the insertion of zeros. The frequency of the sum channel pulse is detected in the magnitude detector 24 using the output of the sum fast Fourier transform 23 to provide self-tuning of the voltage controlled oscillator 27. The voltage frequency control output signal provided by the peak detection and centroid circuit 25 may be supplied to the local oscillator 15 (IF oscillator 15) instead of the Gunn voltage controlled oscillator 27 (indicated by the dashed arrow in FIG. 2).

The magnitude and phase of the received return signal is used to calculate the offset of the null from center of the scan pattern (determined by the null location algorithm equations given above), and as is performed in the angle estimation circuit 28. For a maximum incidental slew rate of less than 75 kHz/msec, for example, the signal deviates by less than half the 75 kHz bandwidth of the fast Fourier transforms 23 during the 0.5 msec interval between bursts, and thus can be tracked from burst to burst. A suitable unlocked Gunn voltage controlled oscillator 27 is available from the assignee of the present invention and described in Hughes' Millimeter Wave Products Catalog, attains slew rates less than the above-stated level and thus meets the requirement.

The performance of this unlocked voltage controlled oscillator 27 was estimated using the curve for the FM noise density in the catalog and computing the frequency drift using the equation:

$$\Delta f = \frac{12 \sqrt{<\phi^2>}}{\pi t},$$

where $<\phi^2>$ = the expected value of the average of the square of the nonlinear phase, $$<\phi^2> = \int_{?}^{?} \left(1 - \frac{\sin \pi ft}{\pi ft}\right) n(f) df,$$

t=0.5 msec (burst to burst period),
r=0.2 msec (burst duration),
n(f)=the FM noise density (page 69 of the catalog, and
f=the frequency.

The estimated frequency drift was computed to be δf=14.8 kHz over 0.5 msec, <75 kHz/msec. The loss due to the nonlinear phase caused by frequency slewing over the 0.2 μsec burst was estimated using the equation:

$$L = -10 \log \left(1 - \frac{\phi^2}{2}\right) = 0.8 \text{ dB}$$

which is negligible for most applications.

Depending on the particular waveform and oscillator that are employed, the frequency variation of the unlocked oscillator 27 may be high enough to cause significant pulse-to-pulse errors if the frequency rate is not estimated. In addition, the frequency change between bursts might exceed one-half the PRF, thus complicating control of the oscillator 27 based on pulse-to-pulse frequency measurements. To address the first problem, the algorithm described below may be used to calculate the relative difference channel phase. This algorithm utilizes an estimate of the frequency rate from two pairs of sum pulses that surround a pair of difference pulses (as shown in FIG. 1, for example), and provides an accurate phase estimate as long as the frequency rate is less than $PRF^2/8$.

In this algorithm, complex voltages are represented by $x_i$, where pulse index values i=0, 1, 4, and 5 correspond to sum pulses and i=2 and 3 correspond to difference pulses. The average normalized angular frequency is determined from the equation:

$$w = \tfrac{1}{2} \arg(x^*_0 x_1 x^*_4 x_5)$$

and is adjusted by $\pi$ according to the following test:

$$w \rightarrow w + \pi \text{ if } |x_1 - t| < |x_1 + t| \text{ where } t = e^{-j3w} X_4.$$

The voltages are then adjusted by a frequency given by:

$$y_i = e^{-jiw} x_i.$$

The sum of the difference channel voltages and correction terms for the average phase and quadratic phase are formed using the equations:

$$c_d = y_2 + y_3$$

$$c_0 = (y_0 + y_1 + y_4 + y_5)^*$$

$$c_q = y_0^* y_1 + y^*_4 y_5.$$

Finally, the phase is found using the equation $p = \arg(c)$, where $c = c_d c_q c_{d1}$. If several sets of pulses are available, then $c_k$ may be derived as above for each set k (with consecutive sets overlapping on pairs of sum pulses), and the phase is derived from the sum over sets and is given by:

$$p = \arg \sum_k c_k.$$

To overcome the second problem, a rough estimate of the unambiguous oscillator frequency offset is obtained using intrapulse sampling, for example. For an example waveform having 0.5 μsec pulses, a 10 MHz real sample rate with digital conversion to IQ at 5 MHz, or a 5 MHz complex sample rate from an analog IQ detector may be used. The frequency estimate is obtained from the phase shift between consecutive samples, and the estimate may be improved by averaging over sum pulses within a burst. This frequency estimate is used to control the frequency of the unlocked voltage controlled oscillator 27 so that the downconverted signal is approximately centered within the passband of the video filter 17.

Thus, a coherent W-band radar receiver that provides pulse-to-pulse coherence using an unlocked Gunn voltage controlled oscillator has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. A coherent W-band radar receiver that processes pairs of sum and difference pulses reflected from a target, said receiver comprising:

a scanning antenna having a predetermined scan pattern for sequentially receiving the pairs of sum and difference pulses reflected from a target;

an unlocked voltage controlled oscillator;

a local oscillator;

a downconverter for downconverting the received pairs of sum and difference pulses into corresponding video signals;

an analog-to-digital converter coupled to the automatic gain circuit for digitizing the video signals;

a digital IQ conversion circuit coupled to the analog-to-digital converter for generating complex samples of the sum and difference channel signals;

sum and difference fast Fourier transforms coupled to the digital IQ conversion circuit for respectively generating sum and difference output signals;

a magnitude detector coupled to the sum and difference fast Fourier transforms for generating a voltage frequency control output signal that is selectively coupled to the unlocked voltage controlled oscillator or local oscillator and is used to control its frequency;

a peak detection and centroid circuit coupled to the magnitude detector for determining the frequency offset of the transmitter from the bistatic unlocked voltage controlled oscillator center frequency;

a phase determination circuit coupled to the peak detection and centroid circuit for determining the phase between the sum and difference signals; and an angle estimation circuit coupled to the phase determination circuit for estimating the offset of the null from the center of a scan pattern produced by the antenna using the magnitude and phase of the processed sum and difference pulses and a predetermined null location algorithm.

2. The receiver of claim 1 wherein the downconverter comprises a two-stage downconverter having a first mixer having a voltage frequency control input coupled to the unlocked voltage controlled oscillator, a first amplifier coupled to an output of the first mixer, a second mixer having a voltage frequency control input coupled to the local oscillator that is coupled to a second amplifier.

3. The receiver of claim 1 further comprising an automatic gain circuit coupled to the downconverter.

4. The receiver of claim 1 wherein the unlocked voltage controlled oscillator comprises an unlocked Gunn oscillator.

5. The receiver of claim 1 wherein the voltage frequency control output signal that is coupled to the unlocked voltage controlled oscillator.

6. The receiver of claim 1 wherein the voltage frequency control output signal that is coupled to the local oscillator.

* * * * *